United States Patent [19]

Sauda et al.

[11] Patent Number: 4,772,430
[45] Date of Patent: Sep. 20, 1988

[54] PROCESS FOR COMPACTING AND SOLIDIFYING SOLID WASTE MATERIALS, APPARATUS FOR CARRYING OUT THE PROCESS AND OVERALL SYSTEM FOR DISPOSAL OF SUCH WASTE MATERIALS

[75] Inventors: Kenzo Sauda; Akitoshi Yokota; Takuro Yagi, all of Yokohama; Saburo Kita, Tokyo; Hiroshi Kuribayashi, Yamato; Yoshihiko Uchida, Yokosuka, all of Japan

[73] Assignees: Jgc Corporation, Uchisaiwai; Owl Co., Ltd., Tokyo, both of Japan

[21] Appl. No.: 814,101

[22] Filed: Dec. 27, 1985

[30] Foreign Application Priority Data

| Jan. 11, 1985 | [JP] | Japan | 60-2202 |
| May 29, 1985 | [JP] | Japan | 60-115608 |
| Jun. 5, 1985 | [JP] | Japan | 60-120667 |
| Nov. 14, 1985 | [JP] | Japan | 60-253803 |

[51] Int. Cl.$^4$ ............................................. G21F 9/16
[52] U.S. Cl. ................................. 252/628; 252/632; 264/0.5; 264/25; 264/176.1; 264/211; 264/211.21; 521/28
[58] Field of Search ................ 252/628, 629, 626; 264/0.5, 25, 125, 176.1, 177.11, 211, 211.21; 34/12; 159/DIG. 12; 521/28

[56] References Cited

U.S. PATENT DOCUMENTS

| 3,463,738 | 8/1969 | Fitzgerald et al. | 252/628 |
| 4,122,048 | 10/1978 | Buchwalder et al. | 521/26 |
| 4,167,491 | 9/1979 | Gablin et al. | 252/628 |
| 4,242,220 | 12/1980 | Sato | 252/628 |
| 4,280,922 | 7/1981 | Puthawala et al. | 252/628 |
| 4,460,499 | 7/1984 | Boden | 252/628 |
| 4,559,170 | 12/1985 | Gay et al. | 252/628 |
| 4,585,583 | 4/1986 | Roberson et al. | 252/628 |

FOREIGN PATENT DOCUMENTS

| 2631326 | 7/1976 | Fed. Rep. of Germany | 252/628 |
| 2090045 | 6/1982 | United Kingdom | 252/628 |

Primary Examiner—Stephen J. Lechert, Jr.
Assistant Examiner—Howard J. Locker
Attorney, Agent, or Firm—Bucknam and Archer

[57] ABSTRACT

A process for compacting and solidifying solid waste materials to effect the volume reduction thereof simultaneously with the solidification thereof with thermoplastic resins originally contained in the waste materials and, if necessary, supplementary thermoplastic resins externally supplied thereto, thus facilitating the waste materials for temporary storage or final disposal thereof; an appartus for carrying out said process; and an overall system for disposal of the waste materials.

3 Claims, 7 Drawing Sheets (A) (B)

PROCESS FOR COMPACTING AND SOLIDIFYING SOLID WASTE MATERIALS, APPARATUS FOR CARRYING OUT THE PROCESS AND OVERALL SYSTEM FOR DISPOSAL OF SUCH WASTE MATERIALS

BACKGROUND OF THE INVENTION

1. Field of the Invention

This invention relates to a process for compacting and solidifying various solid waste materials to effect the volume reduction thereof simultaneously with the solidification thereof with thermoplastic resins contained in the waste materials and, if necessary, supplementary thermoplastic resins externally supplied thereto, thus facilitating the waste materials for temporary storage or final disposal thereof, to an apparatus for carrying out said process and to an overall system for disposal of the waste materials. The various solid materials include combustibles such as paper towels, rags, working gloves, veneer boards and hampen ropes; incombustibles such as electric cords, aluminum foils and concrete blocks; and others such as plastic-made sheets and ropes, and rubber-made hoses, gloves and boots, the plastics usually comprising at least thermoplastic resins such as PE (polyethylene) and PVC (polyvinyl chloride), and the above waste materials being discharged from homes and factories. The solid waste materials referred to herein also include those, such as ion exchange resins, concrete fragments and insulating materials, which are likely to have been radioactively contaminated due to the use thereof in atomic power plants, and further include harmful heavy metals-containing ion exchange resins discharged from general industrial factories as waste materials.

2. Prior Art

Urban waste materials including various plastics, metals, glass and rubbers discharged from homes and factories, are so-called "combustion-unsuitable waste materials" and they have been disposed of by incineration, landfill or resource recovery. These disposals, however, cause their respective problems or troubles. The various plastics in the waste materials will, in many cases, mainly cause troubles such as clogging of incinerators by molten plastics, damage of the incinerators by local overheating and evolution of harmful gases such as chlorine and dioxin. In case of the landfill disposal, there is much of bulky waste materials such as foamed polystyrene and polyethylene sheets or bags. These bulky waste materials will need high transportation cost and will sometimes come out from underground after once buried in the ground thereby to be blown in pieces by the wind, thus polluting the environments. There have recently been proposed various methods for recovering and exploiting various waste plastics from the viewpoint of effective reuse of resources. In spite of these proposals, however, there is still not overcome the disadvantage that it costs too much to sort urban waste materials since they are composed of various and miscellaneous materials.

There has thus been proposed a method for producing coarse pelletized compacted mixtures by adding particulate inorganic materials (such as sand, rubble, and ashes obtained by incineration) to urban waste materials with aid of thermoplastic resins contained therein (Japanese Patent Gazette No. 57-11273). The method so proposed is still unsatisfactory in that metal pieces, cloths and the like are not pelletized and they are required to be treated after sorting of the urban waste materials.

On the other hand, it has been customary that thermoplastic resin sheets (such as PE and PVC sheets, paper rags, rags, concrete pieces, steel materials, high performance filters, insulating materials, ion exchange resins and the like, which are contaminated with radioactive materials while they are handled in nuclear power plants, are packed in thermoplastic resin bags or else packed therein after the contaminated waste materials have been sorted into combustibles, incombustibles and combustion-unsuitable materials if necessary, after which the bags so packed are encapsulated in drum cans for custody or storage.

As one example, in a case where a comparatively large-sized contaminated waste material such as a high performance filter, composed integrally of wood, filter medium (inorganic material), metal plates and the like, is disposed of, it is necessary to disjoint the waste material and sort the disjointed members thereby disadvantageously making the disposal steps complicated and increasing the possibility of exposing the workers to radioactivity; thus, there has been proposed a specific device for disjointing such a large-sized waste material to prevent the workers from being exposed to radioactivity and facilitate the disposal of the waste material (Japanese Utility Model Gazette No. 59-42720). However, the incombustibles (other than wood) of the disjointed members are destined to be encapsulated in drum cans for storage.

As another example, ion exchange resins are now used for, for instance, purifying condensed water or disposing of waste water in nuclear facilities such as nuclear power plants. The thus used ion exchange resins will raise a problem as to the disposal thereof as waste materials since they are contaminated with radioactivity.

Since, for example, some of the thus used ion exchange resins has radioactivity of as high as $10^1$–$10^{-2}$ $\mu$Ci/cc and contain Cs and Sr having a long half-life, they must be stored in the safer form for a long time; to this end, there have been researched and developed a method for volume reduction by incineration or wet-type decomposition, and a method for direct solidification with cement, asphalt or plastics, and these methods have already partly been put to practical use. This volume reduction method using incineration, however, will raise a problem that the exchange groups of cation resins of the ion exchange resins decompose to evolve $SO_x$ gas since the ion exchange resins are treated at high temperatures, whereby is raised a problem as to the material of a facility for treating the thus evolved $SO_x$ gas, the recovery thereof and the like. Further, this volume reduction method using wet-type decomposition is disadvantageous in that it not only needs an after-treatment comprising neutralizing $SO_4^{2-}$ remaining in the decomposed solution with caustic soda or the like and then evaporating the thus neutralized solution for concentration but also needs an expensive decomposing agent for the wet-type decomposition, thus raising a problem as to economy. This direct solidification methods are disadvantageous in that, for example, the volume reducibility is low and the treating facilities are expensive.

On the other hand, such ion exchange resins must be housed or encapsulated as radioactive materials in high integrity containers (HIC) for disposal in U.S.A. for example, even if they are hardly harmful because of their extremely low strength of radioactivity. The HIC, however, is too expensive to be used for encapsulation of ion exchange resins having medium strength radioactivity from the economical viewpoint and, therefore, they are usually stored in tanks and are in few cases subjected to final disposal.

Used ion exchange resins discharged from the general industrial fields (not from nuclear facilities) may easily be dealt with and they are thus recovered and heaped or subjected to landfill. Ion exchange resins containing harmful heavy metals will still raise a problem as to their soil contamination and effluence to rivers and streams when treated for disposal.

The drum cans encapsulating the solid waste materials therein have been stored in storage houses. However, since the unoccupied storage spaces have more decreased than expected, the solid waste materials capable of being burnt are subjected to incineration treatment and then ashes produced by the incineration are stored in drums or solidified with cement to form more stable solids thereof. The said incineration treatment applies to bulky materials such as thermoplastic resin sheets and bags as well as waste paper and it has been widely used for the treatment of solid waste materials discharged from nuclear power plants, radioisotope institutes (RI) and the like.

The incineration treatment is disadvantageous in that when solid waste materials containing plastics in a large proportion are incinerated, a furnace used would be damaged and it is therefore necessary to install a waste gas treating device as an accessory to an incinerator for the incineration treatment, thus producing secondary waste materials from the accessory device and incurring an extra expense for installation of the accessory device.

Further, conventional volume reduction treatments by heating or incineration not only need a specific heat source but also leave a problem to insufficient volume reduction for pressure packing of the volume-reduced waste materials in containers.

Miscellaneous solid waste materials may also be treated for volume reduction by compressing them by a press, and there is being developed a volume reduction device using a high pressure, particularly a surface pressure of about 1000 to 3000 Kg/cm$^2$. This device will enable thermoplastic resin sheets and bags, paper rags and the like to be compressed almost without gaps left between the materials and, therefore, it provides an effective method for volume reduction. The compressed body obtained by this method is, per se, a non-homogeneous aggregate of miscellaneous waste materials and it is therefore not preferable for a long-term storage.

SUMMARY OF THE INVENTION

An object of this invention is to provide a process for compacting, without producing secondary waste materials, solid waste materials containing various plastics discharged from homes and factories or radioactive solid waste materials, such as used ion exchange resins, discharged from nuclear power plants, radioisotope institutes (RI) and the like, to solidify the waste materials with a thermoplastic resin to obtain rod-like masses which are convenient for final disposal.

Another object is to provide an apparatus for carrying out the above-mentioned process.

Still another object is to provide an overall system for the disposal of solid waste materials, which comprises a shredder for cutting and crushing miscellaneous solid waste materials containing thermoplastic resins such as polyethylene and polyvinyl chloride, a mixer for substantially uniformly mixing the thus cut and crushed waste materials as required, a screw extrusion molder for compression molding the resultant mixture to obtain rod-like bodies thereof, a cutter for cutting the thus obtained rod-like bodies to obtain pellets thereof and a packing means for packing the thus obtained pellets in containers such as drum cans.

According to this invention, it is preferable that solid waste materials be finely cut or crushed. Since the compacting and solidifying treatment is effected preferably by extrusion molding, it is necessary to finely divide the solid waste materials so that the finely divided waste materials correspond in size to the die diameter of an extruder used, and it is desirable to further pulverize the waste materials after they have been finely divided or crushed.

In this invention, thermoplastic resins are used as a solidifying agent and they are not limited in kind and property and are only capable of solidifying solid waste materials at the time of solidification thereof. These thermoplastic resins may usually be polyethylene (PE) or polyvinyl chloride (PVC) originally contained in the solid waste materials, and a part thereof may be those externally supplied to the solid waste material if necessary. The thermoplastic resins so externally supplied may be new ones, regenerated ones or ones generally discharged as waste plastics since they are used only as a solidifying agent.

Any thermoplastic resins may be used as a solidifying agent as mentioned above, and those which are softened or melted at temperatures of about 120°-260° C. can generally be most conveniently used and are also preferable from the viewpoint of the amounts of electric power and heat consumed in extrusion molders at the time of solidifying treatment. However, thermoplastic resins used as a solidifying agent in treating used ion exchange resins should be those which are melted at 100°-190° C. as PE, PVC and the like. When a mixture of used ion exchange resins and solid waste materials is compression molded under agitation at said temperature, $SO_x$ gases will not be evolved (since the temperature at which $SO_x$ gases will be evolved is in the range of 200°-350° C.) and the water contained in the waste materials will evaporate thereby to obtain moldings substantially without free water, thus eliminating the need of expensive HIC.

It is preferred that the used ion exchange resins be drained for some dehydration.

It is of course possible to compact and solidify solid waste materials even if they originally contain such used ion exchange resins.

It is necessary for the solidification that solid waste materials contain thermoplastic resins in an amount of 10 wt.% or more, and it is possible to solidify the solid waste materials as far as they contain moisture in an amount of up to 30 wt.% although it is preferable that they contain moisture in as less an amount as possible (Refer to the following Examples). The above amount of at least 10 wt.% of thermoplastic resins includes the amount of externally supplied ones.

In this invention, the solidification is effected by an extrusion molder and it does not need external heating or needs external heating only as supplementary heating since friction heat is produced by solid waste materials moving through between the inner wall of the extrusion molder and the compression screw therein in sliding relation to these wall and screw.

The apparatus for compacting solid waste materials, comprises a shredder for cutting and crushing miscellaneous solid waste materials which contain combustibles such as PE, PVC and other thermoplastic resins, incombustibles etc., a mixer for substantially uniformly mixing the thus cut and crushed waste materials together as required, a screw extrusion molder for compression molding the thus crushed and mixed waste materials to obtain rod-like masses, a cutter for cutting the thus obtained rod-like masses to obtain pellets and a packing means for packing the thus obtained pellets in containers such as drum cans.

This invention will be better understood by the following Examples with reference to the Figures.

Figure 1:
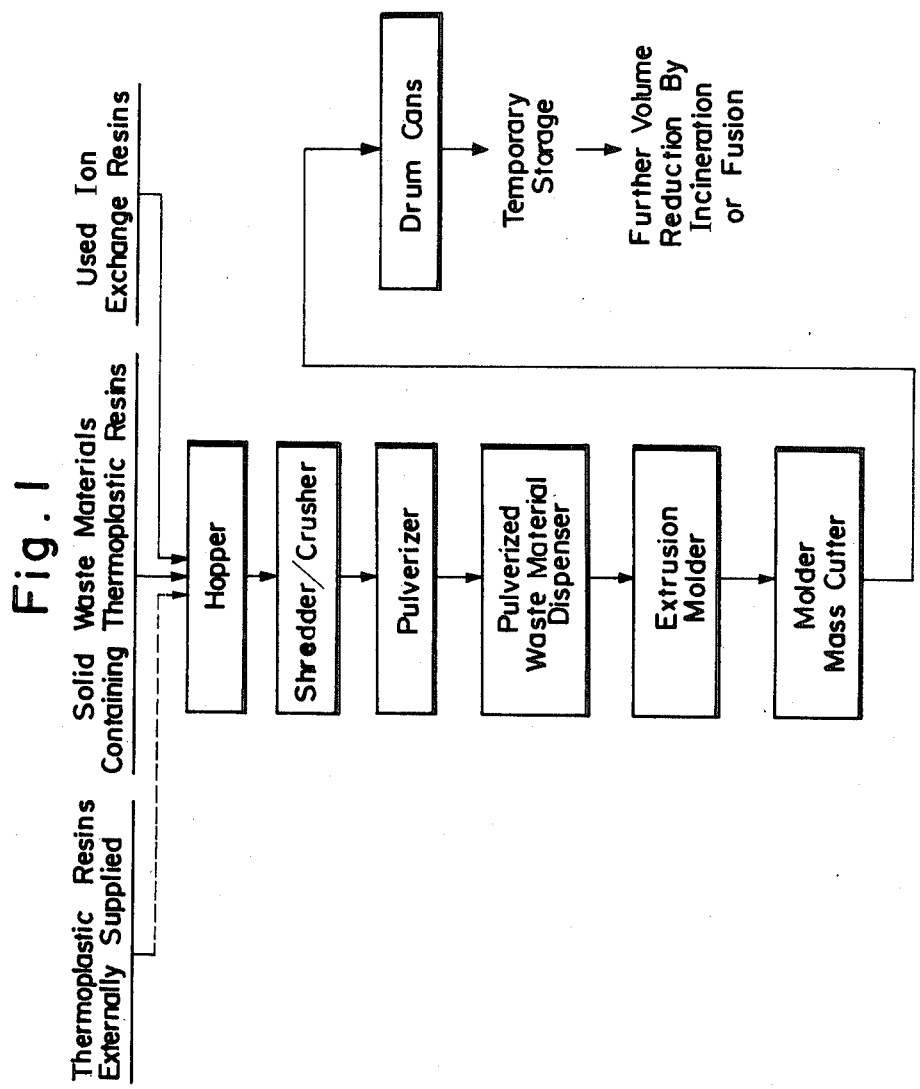
FIG. 1 is a flow sheet showing the treating steps in an overall system for disposal of solid waste materials according to this invention.

Referring now to FIG. 1, solid waste materials, for example, low-level radioactive miscellaneous solid waste materials, discharged from nuclear power plants or the like, are introduced through a hopper, a shredder or crusher where the waste materials are crushed, a pulverizer for pulverization if necessary, and a dispenser for dealing out the pulverized waste materials in fixed portions, into an extrusion molder where the pulverized waste materials are compacted and solidified thereby to produce rod-like, stand-like or like masses which are then cut into pellets if necessary and packed in containers such as drum cans for storage. In a case where supplementary thermoplastic resins are externally supplied, they are supplied through the dispenser to the extrusion molder where these resins are kneaded with the waste materials and then molded into said compacted and solidified masses. In the compaction and solidification step, it is possible to soften or melt the thermoplastic resins with friction heat by suitable selection of a ratio of compression of the waste materials in the extrusion molder. Thus, it is either unnecessary to externally heat the die and its neighboring portions except at the initial stage of operation of the extrusion molder, or only necessary to externally supply supplementary heat to said portions, thus being also preferable from the viewpoint of energy economy. The solidification in the extrusion molder is effected at approximately 120°–260° C. (about 100°–190° C. in cases where used ion exchange resins are solidified without evolution of $SO_x$ gases).

The solid waste materials so solidified look as if they were buried in the thermoplastic resins, and they are extremely compact and stable when immersed in water. The solidified waste materials are remarkably reduced in volume as compared with the original. Since the amount of thermoplastic resins contained in solid waste materials is usually enough for the solidification, a synergistic volume reduction effect can be achieved.

EXAMPLE 1

There were provided simulated solid waste materials having the composition indicated in the following Table 1 in which all numerical values are by weight.

TABLE 1

| Composition of waste material | Simulated waste material | Example 1 |
| --- | --- | --- |
| Cellulose | Rag (cotton cloth) | 22.1 |
| Polyethylene | Polyethylene sheet | 39.7 |
| Polyvinyl chloride | Polyvinyl chloride sheet | 2.1 |
| Rubber | Rubber gloves | 1.1 |
| Total amount of combustibles | | 65.0 |
| Metal | Aluminum sheet (0.5 mm thick) | 9.0 |
| Glass Asbestos | Heat insulation material (Pearlite) | 5.0 |
| Concrete | Concrete | 6.0 |
| Total amount of incombustibles | | 20.0 |
| Moisture (Water) | | 15.0 |
| Grand total | | 100.0 |

Figure 2:
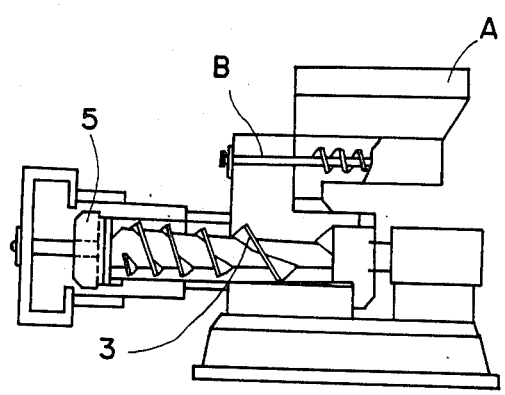
FIG. 2 is a schematic elevational view of an example of a compacting and solidifying apparatus, which is an extrusion molder, with its accessory device used in the overall system of this invention.

The simulated waste materials (the water being previously absorbed in the rag) were crushed into pieces having a size of not larger than 4 mm square or cube by a cutter mill and then introduced into an extrusion molder as indicated in FIG. 2. In this Figure, symbol A indicates a hopper, symbol B a dispenser, numeral 3 a compression screw and numeral 5 a die. The forward portion (near the die 5) of the compression screw 3 is like a cutter in shape and functions as a mixer for sufficient mixing of the cut and pulverized waste materials.

The simulated waste materials were passed through the hopper A and dispenser B to the compression screw 3 rotating at 150 r.p.m. where they were kneaded under compression to generate heat by friction with the barrel of the extrusion molder whereupon the thermoplastic resins in the waste materials were softened or melted, and the waste materials were pushed toward the open end of the compression screw 3, subjected to shearing force of said cutter-like portion and then passed through the die 4 to continuously produce 20 of rod-like or strand-like masses each having a 12-mm diameter which were intentionally broken off in a bundle when the length of the masses withdrawn from the die reached a suitable one. These broken masses were allowed to cool without being fusion-bonded to each other, thus obtaining satisfactory compacted and solidified masses.

EXAMPLES 2-5

Figure 3:
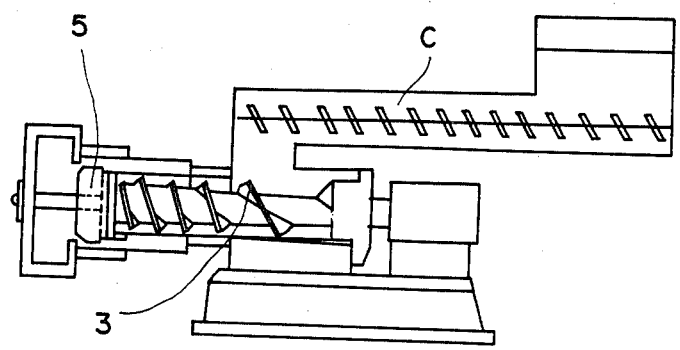
FIG. 3 is a schematic elevational view of another example of a compacting and solidifying apparatus, which is an extrusion molder, with its another accessory device.

The simulated waste materials having the composition indicated in Table 2 were crushed into pieces having a size of not larger than 4 cm square or cube, passed through a 150 mm φ biaxial paddle screw-type dispenser C rotating at 16 r.p.m. as shown in FIG. 3 to an extrusion molder as indicated in FIG. 3 thereby to obtain the same secure and uniform solidified masses as obtained in Example 1. In this case, the heater temperature at the die (130 mm φ×35 mm) portion having 62 holes or passages (each 8 mm φ) was set at 170° C., however, such heating was not necessary except at the initial stage of operation of the extrusion molder.

TABLE 2

| Simulated waste materials | Example 2 | Example 3 | Example 4 | Example 5 |
|---|---|---|---|---|
| Polyethylene | 37.7 | 9.4 | 30.8 | 43.4 |
| Rag | 20.8 | 49.1 | 16.9 | 23.9 |
| Polyvinyl chloride | 1.9 | 1.9 | 1.5 | 2.2 |
| Rubber | 0.9 | 0.9 | 0.8 | 1.1 |
| Wood chips | 5.7 | 5.7 | 4.6 | 6.5 |
| Aluminum foil | 8.5 | 8.5 | 6.9 | 9.9 |
| Pearlite | 4.7 | 4.7 | 3.9 | 5.4 |
| Concrete | 5.7 | 5.7 | 4.6 | 6.5 |
| Copper wire | 0.9 | 0.9 | 0.8 | 1.1 |
| Moisture | 13.2 | 13.2 | 29.2 | 0.0 |
| Total | 100.0 | 100.0 | 100.0 | 100.0 |

As is mentioned above, it is possible according to this invention to compact and solidify solid waste materials for reduction of the volume thereof; this volume reduction effect is much improved as compared with the effect obtained by conventional baling treatment. This invention may conveniently apply to the compaction and solidification treatment of radioactive solid waste materials which are otherwise particularly difficult to treat so.

The compaction and solidification according to this invention is conveniently effected by a specific extrusion molder.

Miscellaneous solid waste materials containing thermoplastic resins such as PE and PVC are cut and crushed and then introduced into an extrusion molder where the waste materials are compression passed through die holes (or molding holes) while generating friction heat between the waste materials and the inner wall of the die holes, thereby to obtain rod-like moldings simultaneously with melting the thermoplastic plastics contained in the peripheral portions of the thus obtained rod-like moldings, thus forming a plastics impregnated layer in the peripheral portions. The extrusion molder used herein comprises a molder body case and extrusion screw which form a compression room together, a cutter for further crushing and agitating the waste materials compressed by said extrusion screw, and a die for molding the waste materials, which are compression inserted by said screw, into rod-like masses, the die having die holes which are large in diameter and long with an opening ratio enough to melt the thermoplastic resins contained in the peripheral portion of the rod-like moldings by the friction heat generated between the inner wall of the die holes and the waste materials.

EXAMPLES 6-12 AND REFERENCE EXAMPLE

In Examples 6-12, used ion exchange resins which had been drained (the moisture content of the drained resins: 42 wt.%) were mixed with simulated waste materials or polyvinyl chloride in varied mixing ratios to form mixtures which were then subjected to compaction and solidification treatment as indicated in Table 3. As is seen from Examples 6-12, the volume of the original waste materials was about 50 l on one hand, that of the post-treatment waste materials was 10 l on the other hand, the latter volume being about one-fifth (1/5) of the former.

The treatment in Examples 6-12 was effected as follows.

The waste materials indicated in Table 3 were crushed into pieces having a size of not more than 4 mm square or cube and then introduced through the hopper A and the dispenser B into the extrusion molder 1 as indicated in FIG. 2, in which molder the waste materials were passed under compression to the cutter-like forward end of the compression screw 3 rotating at 150 r.p.m. in order to crush

TABLE 3

| | Amounts of Waste Materials To Be Treated*[4] | | | | Amounts of*[4] Post-Treatment Waste Materials |
|---|---|---|---|---|---|
| | Simulated*[1] Waste Materials | Polyvinyl*[2] Chloride | Used Ion*[3] Exchange Resins | Total | |
| Reference Example | — | 50 (5.0) | — | 50 (5.0) | 8.3 (5.0) |
| Example 1 | — | 45 (4.5) | 0.6 (0.5) | 45.6 (5.0) | 8.2 (4.9) |
| Example 2 | — | 40 (4.0) | 1.2 (1.0) | 41.2 (5.0) | 7.8 (4.7) |
| Example 3 | — | 35 (3.5) | 1.8 (1.5) | 36.8 (5.0) | 7.4 (4.5) |
| Example 4 | 50 (5.0) | — | 0.7 (0.56) | 50.7 (5.56) | 8.8 (5.3) |
| Example 5 | 50 (5.0) | — | 1.5 (1.25) | 51.5 (6.25) | 9.6 (5.7) |
| Example 6 | 50 (5.0) | — | 2.6 (2.14) | 52.6 (7.14) | 10.5 (6.3) |
| Example 7 | 50 (5.0) | — | 6.1 (5.0) | 56.1 (10.0) | 13.3 (8.0) |

Note:
*[1]Polyethylene 49 wt. %, Polyvinyl chloride 18 wt. %, rubber 8 wt. %, rags 6 wt. % and 19 wt. %
*[2]Herculite 80 equivalent
*[3]Moisture content 42 wt. %
*[4]Numerals are by volume (l) and parenthesized numerals by weight (Kg).

them and thoroughly mix the crushed waste materials together and then passed through the die 5 to produce 20 of 12-mm diameter, rod-like or strand-like and solidified masses peripherally covered with a layer solidified with the thermoplastic resins. The solidified masses so produced were cut into pieces having a suitable length and then allowed to cool, thus obtaining satisfactory solidified pieces without fusion bonding to each other as those obtained in Reference Example.

The solidified pieces thus obtained had a moisture content of 2 wt.% or less. Further, the surface of the solidified pieces was more satisfactory with the increase in resin mixing ratio. They were immersed in water at room temperature for 3 months with the result that, after the immersion, they exhibited no change in shape and weight, this proving that they had satisfactory water resistance.

As is seen from the foregoing, the cost of disposal of solid waste materials according to this invention is in the range of from a half to less than one-tenth (from ½ to less than 1/10) of the conventional cost required for the use of HIC, decomposition and after treatment, and direct solidification. This invention enables the used ion exchange resins to be easily compacted for volume reduction at such a low cost. The reason for this is that according to this invention, the costs of initial installations, operations, decomposing agents, solidifying agents and the like are low. This invention may suitably apply to compacting and solidifying treatment of used radioactive or harmful heavy metals-containing ion exchange resins which will particularly be attended by economical difficulties when treated. The compacted and solidified masses produced according to this invention have satisfactory properties and substantially prevent the radioactive or harmful substances from exuding therefrom.

EXAMPLE 13

The extrusion molder used herein will be explained hereunder in more detail by reference to FIGS. 4 to 7.

Figure 4:
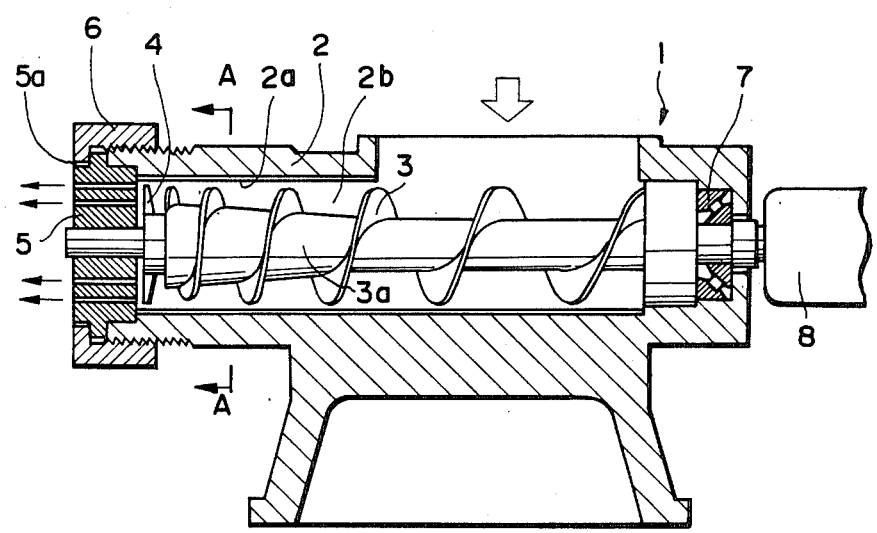
FIG. 4 is an elevational sectional view, in detail, of a typical extrusion molder used in the overall disposal system of this invention.

With respect to FIG. 4, an extrusion molder 1 mainly comprises a molder body case 2, an extrusion screw 3, a cutter 4 and a die 5.

Figure 5:
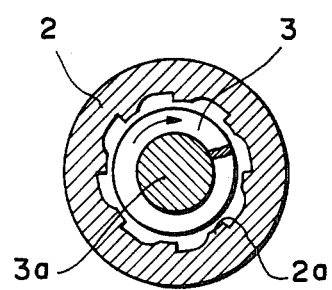
FIG. 5 is a cross-sectional view of the extrusion molder taken along the line A—A of FIG. 4.
Figure 6:
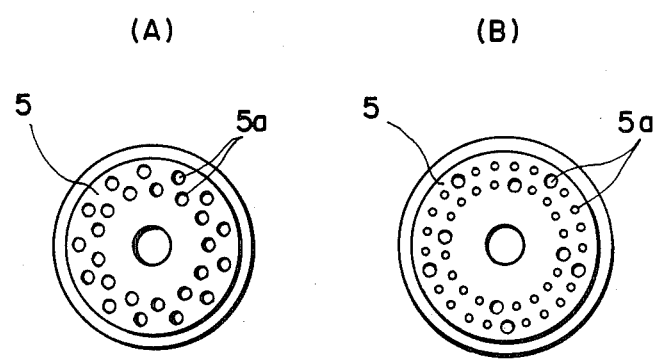
FIGS. 6(A) and 6(B) are front views of illustrative dies used in the extrusion molder, respectively.

The molder body case 2 has several projections 2a, whose cross-section is as shown in FIG. 5, extending longitudinally in the inner surface thereof. In the extrusion screw 3, the pitch of the screw gradually decreases from the right (waste material inlet side) to the left (waste material outlet side), and the screw axis 3a gradually increases in diameter towards the left (waste material outlet side). Thus, the volume of a compression chamber defined by the molder body case 2 and the extrusion screw 3 gradually decreases towards the left thereby enabling the waste material to be compressed. Further, the compression chamber 2b may also be decreased in volume towards the left side by a gradual decrease of the mold body case 2 in inner diameter towards the left in place of a gradual increase of the screw axis 3a in diameter towards the left.

The cutter 4 is provided at the left tip, which is near the die 5, of the screw axis 3a and protrudes from around the left tip.

The die 5 is fitted to the tip of the molder body case 2 by a clamping bolt 6, and the central part thereof constitutes a bearing for the screw axis 3a.

As is apparent from FIG. 6(A), the die 5 has many holes or passages 5a for molding the waste materials. The ratio of total area of the holes to the whole area of the die 5 (the ratio being called herein "opening ratio") may preferably be increased as the content of thermoplastic resins such as PE and PVC increases. The suitable opening ratio is in the range of 10–20%. As indicated in FIG. 6(B), the molding holes 5a may be a combination of holes which are different in size (diameter). In this case, approximately uniform compression and friction forces will be obtained by using the die provides with small-diameter molding holes having a correspondingly small length and with large-diameter molding holes having a correspondingly large length. The molding holes or passages 5a may also be tapered such that they are large in diameter at their inlet and small in diameter at their outlet.

In FIG. 4, numeral 7 indicates a thrust roller bearing and numeral 8 a coupling with the drive shaft of a motor.

The method for extrusion molding solid waste materials using the above-mentioned extrusion molder, will be explained hereunder.

At the initial stage of operation, the extrusion molder 1 is suitably heated to a die temperature of about 100°–130° C. by an external heating means (not shown) which is out of operation during the usual operation of the molder 1.

Miscellaneous solid waste materials to be treated are cut and crushed and then mixed together by a mixing means as required before introduced into an extrusion molder. Such mixing is unnecessary in a case where the waste materials are composed wholly or almost wholly of thermoplastic resins.

The waste materials supplied to the extrusion molder 1 are sent towards the die 5 while they are compressed by the extrusion screw 3. At this time, the waste materials generate heat due to their compression in the compression chamber 2b, their friction with the extrusion screw 3, shearing forces between the protrusions 2a and the extrusion screw 3, and the like, whereby PE and PVC contained in the waste materials start to be softened or melted. The waste materials sent to the forward end of the extrusion screw 3, are cut and agitated by the cutter 4 to be further finely divided and then sent under compression into the molding holes 5a of the die 5 while they are elevated in temperature.

In the molding holes 5a, the waste materials so compressed cause friction with the inner wall of the holes 5a whereupon the portion of the waste materials which is near the inner wall, is further elevated in temperature. Thus, the PE and PVC contained in the peripheral portion of the waste materials which are being molded into rod-like masses, are further melted by said friction heat thereby securely solidifying the rod-like masses.

Figure 7:
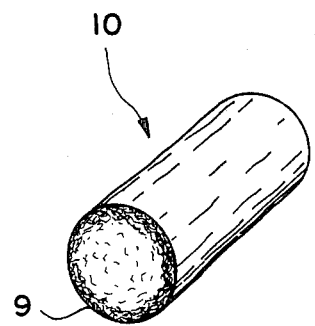
FIG. 7 is a perspective view of an illustrative extrusion molded rod-like product, cut into a piece.

The rod-like masses 10 in the peripheral portion of which the PE and PVC are melted to form a plastics-solidified layer 9 as shown in FIG. 7, are either forcibly cooled at the outlet of the die 5 by a cooler or the like or allowed to cool with the open air whereby the PE and PVC melted in the peripheral portion of the masses are shrunk and hardened to securely coat the masses 10, thus obtaining stable high-density rod-like masses 10 which are then pelletized if necessary. In a case where the die 5 is provided with molding holes 5a which are different in diameter, it is possible to obtain differently sized pellets at the same time and in a fixed mixed ratio.

As is seen from the foregoing, the effects or advantages obtained by the specific extrusion molding are as follows.

(1) The thermoplastic resins contained in the peripheral portion of the rod-like molded masses are surely melted by the friction heat generated between the masses and the inner wall of the molding holes of the die whereupon the rod-like masses are reinforced at their peripheral portion with the plastics-solidified layer as if they were covered with a crust, thus obtaining stable high-density moldings.

(2) Secure plastics-solidified layers can be formed by selecting the size of diameter of molding holes of the die, the opening ratio of the die, the length of holes (passages), and the like depending on the composition of waste materials.

(3) High-quality molded masses or moldings can be produced by very simple and inexpensive apparatuses such as extrusion screws and dies.

EXAMPLE 14

An overall system for disposal of solid waste materials according to this invention will be illustrated as follows.

Figure 8:
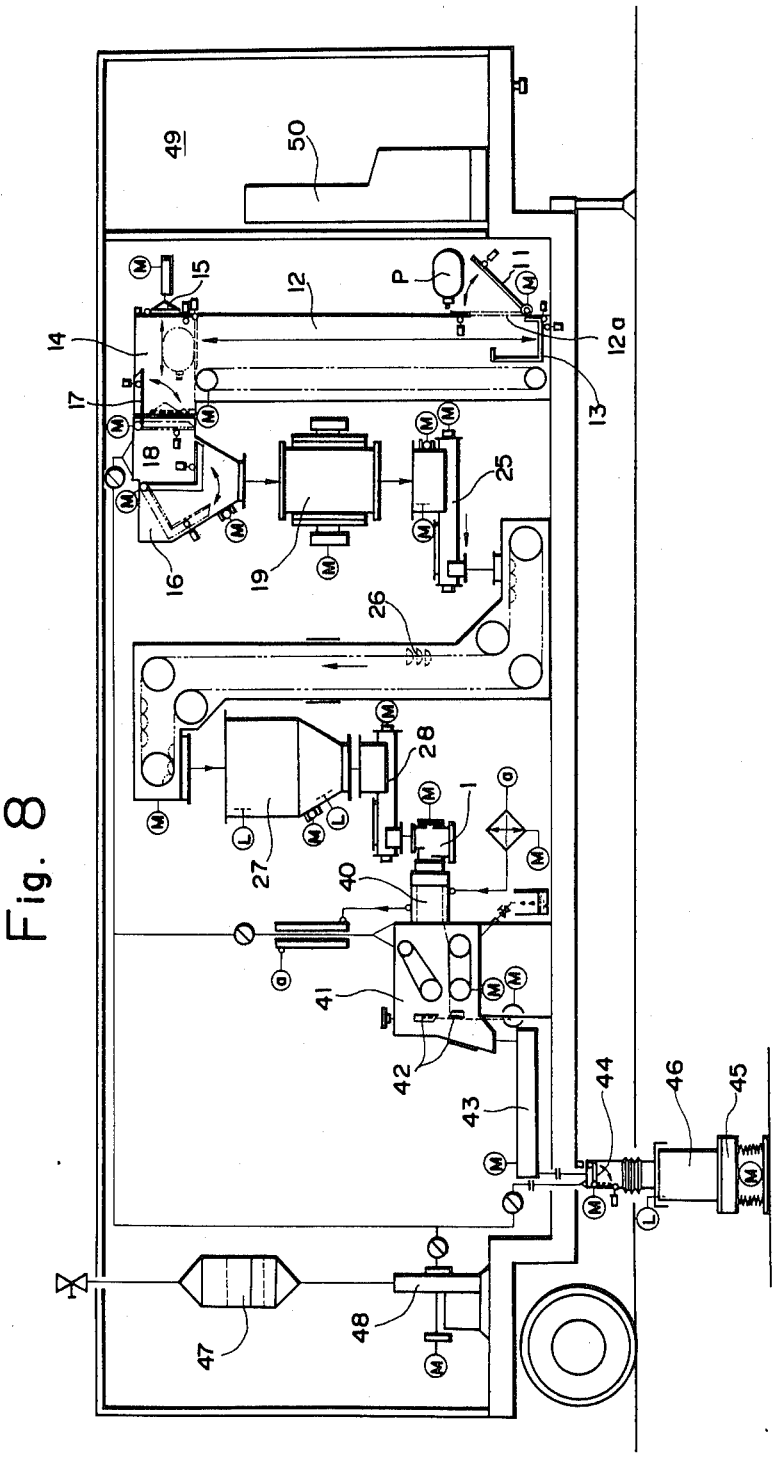
FIG. 8 is a schematic general view of an overall disposal system of this invention.

Referring now to FIG. 8, numeral 11 indicates an easily openable and closable lid which is so fitted that it covers a feed opening 12a provided at the lower end of a lift device 12. The lift device 12 houses therein a lift 13 which is movable up and down. At the upper end of the lift device 12 is formed a preliminary feed chamber 14 in which a pusher 15 is laterally movable.

At the left-hand outlet side of the preliminary feed chamber 14 is continuously provided a feed hopper 16 in which a first gate 17 and a second gate 18 are fitted. The gates 17 and 18 perform opening and enclosing operations alternately in sequence between the solid line and dotted line.

Figure 9:
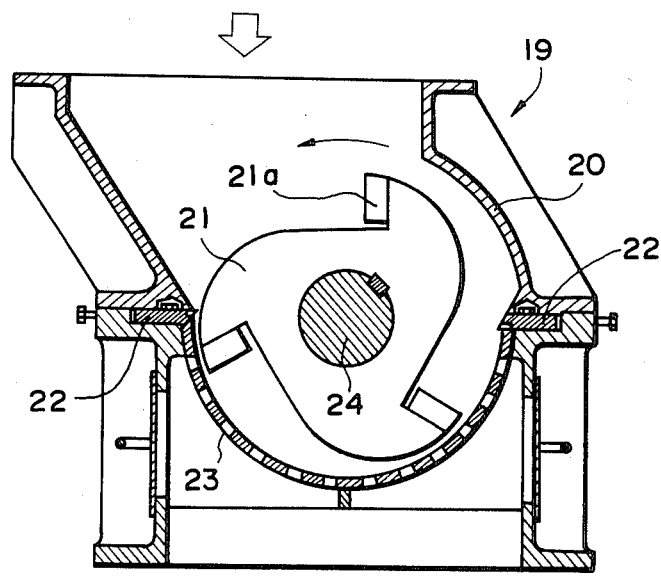
FIG. 9 is a cross-sectional view of a shredder used in the overall disposal system.
Figure 10:
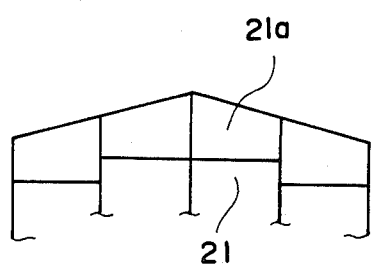
FIG. 10 is a top view of the shredder of FIG. 9.

As indicated in FIG. 9, a shredder 19 mainly comprises a casing 20, a rotary blade 21, a fixed blade 22 and a screen 23. The rotary blade 21 is fixed to a shaft 24 connected to a motor and can rotate in the direction of arrow symbol; further, as shown in FIG. 10, it is laterally divided and its blade tip 21a constitutes a so-called helical cutter which is slantwise arranged so that it retrogrades to the left and right.

The fixed blade 22 is fitted to a casing 20 extending around the rotary blade 21 and cuts solid waste materials in cooperation with the blade tip 21a of the rotary blade 21. The screen 23 extends around the lower half of rotation orbit of the rotary blade 21 and the ends thereof are fitted respectively to the fixed blades 22 and 22 (FIG. 9).

In FIG. 8, a screw feeder 25 composed of two parallel screw axes is provided below, or downstream of, the shredder 19. The feed outlet of the screw feeder is connected to the feed inlet of lower end of a swing turn lift 26 composed of many buckets pin-supported by a chain. A stock tank 27 is provided below the feed outlet located at the upper end of the swing turn lift 26 and stores the waste materials temporarily.

Figure 11:
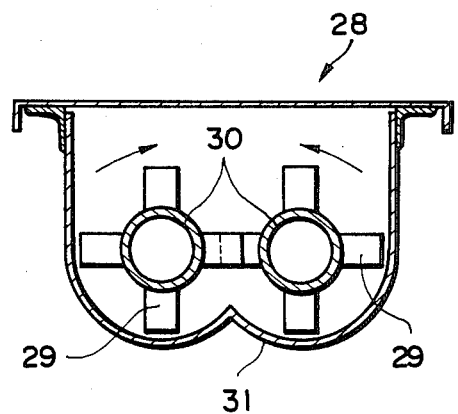
FIG. 11 is a cross-sectional view of a paddle mixer used in the overall disposal system.
Figure 12:
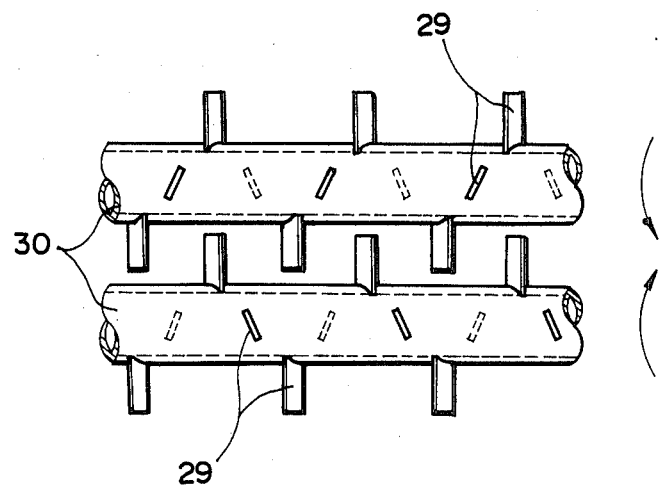
FIG. 12 is a top view of the paddle mixer of FIG. 11.

A paddle mixer 28 is provided below, or downstream of, the stock tank 27. As is shown in FIGS. 11 and 12, in the paddle mixer 28, two screw axes 30 fitted with many vanes 29 are arranged in parallel with each other and can be rotated respectively in the directions indicated by arrow symbols. In this case, the vanes 29 are fitted to the screw axes 30 in such a manner that they are slant with respect to the axial line of the screw axis 30 and the vanes 29 fitted to one screw axis 30 overlap with those 29 fitted to the other 30 (FIG. 11).

Now turning back to FIG. 8, an extrusion molder 1 is provided below, or downstream of, the paddle mixer 28. The extrusion molder used in this overall system for disposal of solid waste materials is the same as shown in FIG. 4. The structure, function and the like of the extrusion molder 1 have previously been mentioned in detail with reference to FIG. 4.

With further reference to FIG. 8, downstream of the molder 1 are arranged a cooler 40 and then a cutter 41 having cutting blades 42. Downstream of the cutter 41 is arranged a conveyor 43. The conveyor 43 may be of a horizontal type as shown or may be of a vertical type such as a vertical screw conveyor or bucket elevator.

Numeral 44 indicates a discharge gate downstream of which is arranged a drum 46 mounted on a vibropacker 45. The vibropacker 45 is intended to give vibrations to the drum 46.

The air located around the feed hopper 16, cutter 41 and discharge gate 44 are suctioned by a fan 48 and filtered by a filter 47 thereby to be purified for discharge to the open air.

The above-mentioned various apparatuses and units are operated and controlled by a control panel 50 provided in a control room 49.

These apparatuses and units are arranged in an enclosed space which is isolated from the outside and are movable in a body in the precinct of buildings such as nuclear power plants. The overall system for disposal according to this invention is of such an enclosed type as mentioned above and will therefore prevent the dusts and the like from scattering to the outside of the system. Further, since the system is movable in a body, it can be used at desired sites or places.

With particular reference to FIGS. 8 and 4, the disposal operation using the above-mentioned overall system will be illustrated as follows.

Such miscellaneous solid waste materials as previously mentioned are packed in a suitable amount in a thermoplastic resin bag P. In this case, too long electric cords, stone, concrete masses and metallic articles such as bolts and nuts, are removed from the waste materials if they are contained therein for efficient use of the disposal system. The waste materials to be fed are controlled in their kinds, sizes, mixing ratios and the like and, further, the waste materials are adjusted so that they contain about 10-20 wt.% of thermoplastic resins by external supply thereof if necessary.

The waste materials so controlled can stably be compacted and solidified.

The resin bag P so packed is fed at the opening 12a onto the lift 13 and, thereafter, the lid 11 is closed. The lift 13 is then elevated to send the bag P into the preliminary feed chamber 14 wherein the bag P is pushed as far as the second gate 18 located at the solid line by the pusher 15. Upon the bag P reaching the second gate 18, the pusher 15 returns to its original position and then the first gate 17 is pivotally moved from the solid line position to the dotted line position thereby to intercept the preliminary feed chamber 14 from the feed hopper 16. When the first gate 17 is closed, the second gate 18 is pivotally moved to the dotted line whereupon it opens to drop and feed the resin bag P to the shredder 19. When the bag P is so withdrawn, the second gate 18 returns to its original solid line position and then the first gate 17 opens at the solid line position for subsequent feeding. The operations of the gates 17 and 18 in sequence are automatically performed under control of limit switches and the like and, the lift 13, in turn, descends accordingly.

The resin bag P fed into the shredder 19 is cut and crushed into suitably sized pieces between the rotary blade 21 and fixed blade 22, and the pieces are passed through the screen 23 to the screw feeder 25.

The rotary blade 21 is a helical cutter and it can therefore handle a wide range of waste materials ranging from soft materials such as paper and cloths to hard materials such as metals and concrete.

The waste materials so cut and crushed are sent in the lateral direction to the feed opening located at the lower end of the swing turn lift 26 and then they are conveyed upward by the lift 26 for temporary storage in the stock tank 27.

The waste materials temporarily stored in the stock tank 17 are suitably dosed or dispensed to the paddle mixer 28 where the cut and crushed waste materials are mixed together particularly to mix the PE and PVC with the rest of the waste materials while they are sent under agitation towards the outlet by the vanes 29 for feeding into the extrusion molder 1. If the waste materials are composed wholly or mostly of thermoplastic resins such as PE and PVC, the mixing operation of the paddle mixer 28 may be omitted.

The extrusion molder 1 is heated to about 100°–130° C. by a suitable external heating means (not shown) at the initial stage of operation of the molder. The heating is suspended during usual operation except the operation at said initial stage.

The waste materials fed to the molder 1 are passed under compression to the die 5 by the extrusion screw 3. At this time, the waste materials generate heat due to said compression force, friction with the extrusion screw 3 and shearing force produced between the protrusions 2a and extrusion screw 3, and the like, whereby the PE and PVC in the waste material start to be softened or melted.

The waste materials containing the softened or melted thermoplastic resins, which have been sent to the forward end of the extrusion screw 3, are further cut and crushed by agitating action by the cutter 4 and then sent under compression to the molding holes 5a of the die 5 while being elevated in temperature. By the agitation, mixing, crushing, heat generation and melting effected in said manner by the cutter 4, high-density molded masses are obtained from the waste materials.

In the molding holes or passages 5a, the waste materials under compression cause friction with the inner wall of the holes 5a to produce friction heat whereby the portion of the waste materials near said wall is further elevated in temperature, and the PE and PVC contained particularly in the peripheral portion of the waste materials being molded into rod-like masses by the molding holes 5a surely melt function as a coking or bonding agent for the waste materials being molded. The selection of opening ratio of the molding holes 5a will enable high-density molded masses to be obtained and this invention to be applied to the disposal of a wide variety of waste materials.

The rod-like molded masses so obtained, particularly those covered at their peripheral portion with the melted PE, PVC, etc., are soon cooled by the cooler 40 provided at the outlet of the die 5 thereby to shrink and harden said resins, thus obtaining stable high-density rod-like moldings which are then sent into the cutter 41. The water vapor together with the rod-like molded masses, withdrawn from the molder 1 was subjected to dew condensation and collected as water in a container.

The rod-like molded masses are passed to the cutter 41 where they are cut into pellets having a length of, for example, about 15–25 mm by the cutting blade 42 and then withdrawn onto the conveyor 43. The pellets so withdrawn onto the conveyor 43 are packed under control of the discharge gate 44 into drums 46 and then subjected to longitudinal vibration by the vibropacker 45 for compaction to achieve high density.

On this occasion, not only the ratio of gap between the pellets will decrease but also the efficiency of packing will increase in a case where differently sized pellets are mixed in suitable ratios and packed as compared with a case in which identically sized pellets are packed. For this purpose, as indicated in FIG. 6(B), it is necessary that the die 5 be provided with molding holes 5a having different diameters. There can thus be obtained differently sized pellets in a desired mixing ratio.

In the above Example the solidified molded masses withdrawn from the extrusion molder are soon forcibly cooled, however, such forcible cooling is not always necessary but such molded masses may be allowed to cool at ambient temperature according to this invention.

What is claimed is:

1. A process for compacting and solidifying solid waste materials, comprising shredding solid waste materials having a moisture content of up to 30% by weight to obtain a shredded mass, and compacting and solidifying said shredded mass at a temperature of 120° to 260° C. by extrusion together with at least one thermoplastic resin as a solidifying agent for said waste materials, said extrusion being carried out under compression in an extrusion molder with a screw to obtain a rod-like mass simultaneously with generating friction heat by friction of the thus obtained rod-like mass with the inner wall of said extrusion molder to melt the thermoplastic resin contained in the peripheral portion of said rod-like mass in sliding relation to said inner wall and said screw, said thermoplastic resin being present in an amount by weight of at least 10% of said solid waste materials whereby a solid mixture of said waste materials and said thermoplastic resin is obtained in the form of a rod-like mass.

2. A process for compacting and solidifying solid waste materials which contain used ion exchange resins which consists of shredding said solid waste materials of moisture content up to 30% by weight to obtain a shredded mass and compacting and solidifying said shredded mass at a temperature of 100°–190° C. by extrusion together with at least one thermoplastic resin as a solidifying agent for said waste materials, said extrusion being carried out under compression in an extrusion molder with a screw to obtain a rod-like mass simultaneously with generating friction heat by friction of the thus obtained rod-like mass with the inner wall of said extrusion molder to melt the thermoplastic resin contained in the peripheral portion of said rod-like mass in sliding relation to said inner wall and said screw, said thermoplastic resin being present in an amount by weight of at least 10% of said solid waste materials whereby a solid mixture of said waste materials and said thermoplastic resin is obtained in the form of a rod-like mass.

3. The process according to claim 1 wherein said extrusion molder is an extruder, said extruder has a die, and said waste material is subdivided to a particle size corresponding to the size of the diameter of said die.

* * * * *